United States Patent [19]

McCanse et al.

[11] 3,989,272
[45] Nov. 2, 1976

[54] VARIABLE OFFSET HITCH

[75] Inventors: James Edson McCanse; Timothy A. Sevick, both of Oregon, Ill.

[73] Assignee: Hesston Corporation, Hesston, Kans.

[22] Filed: July 17, 1975

[21] Appl. No.: 596,612

[52] U.S. Cl. ............................................. 280/460 A
[51] Int. Cl.² ............................................ B60D 1/16
[58] Field of Search ........ 280/415 R, 415 A, 456 R, 280/456 A, 460 R, 460 A, 472

[56] References Cited
UNITED STATES PATENTS

| | | | |
|---|---|---|---|
| 2,467,530 | 4/1949 | Johnson | 280/460 A |
| 2,910,307 | 10/1959 | Jennings | 280/460 R |
| 3,066,952 | 12/1962 | Price | 280/415 A |
| 3,528,684 | 9/1970 | Cowgill | 280/456 R |

Primary Examiner—M. H. Wood, Jr.
Assistant Examiner—R. Schrecengost
Attorney, Agent, or Firm—Schmidt, Johnson, Hovey & Williams

[57] ABSTRACT

A variable offset hitch is especially adapted for selectively positioning a semi-mounted implement in a trailing, laterally offset relationship to a towing tractor having a three-point hitch. A pair of laterally spaced mounts, each having a plurality of horizontally spaced, upright lugs, are secured to the forward end of the implement and receive corresponding lift arms of the three-point hitch through the use of respective removable connecting pins having a length sufficient to span the distance between preselected pairs of lugs on each mount. Lateral displacement, in either direction, of the implement relative to its normal operating disposition behind the tractor is determined by the location of the tractor lift arms with regard to selected pairs of the horizontally spaced lugs. Relocation of the tractor lift arms relative to the lugs to effect the lateral repositioning of the implement with respect to the tractor does not interfere with the operation of a drive line between the tractor and the implement or the raising and lowering of the lift arms to control the height of the forward end of the implement with respect to the ground.

7 Claims, 4 Drawing Figures

VARIABLE OFFSET HITCH

This invention relates to a hitch structure for a semi-mounted implement in which the same is connected to a tractor equipped with a three-point hitch having a pair of powered, vertically swingable lift arms. More specifically, the hitch structure herein disclosed is associated with a rotary cutter of the kind that is normally disposed in a laterally offset trailing relationship to its towing tractor for mowing between, around and beneath orchard trees.

It is, therefore, a very important object of our invention to provide a variable offset hitch structure for a semi-mounted implement secured to a tractor having a three-point hitch in which the implement may be selectively disposed in a normal trailing disposition behind the tractor or offset either to the left or to the right of its normal traling disposition relative to the path of travel of the tractor.

Yet another important object of the present invention is to provide a variable offset hitch structure in which the lift arms of a three-point hitch assembly of a tractor are utilized to support the front of the implement and selectively control the height thereof from the ground while at the same time permitting selective offset positioning of the implement relative to its normal trailing disposition.

Another significant object of the invention is to provide a variable offset hitch structure for an implement secured to a tractor having a three-point hitch that allows lateral adjustment of the implement relative to the tractor without operably affecting any drive components that may interconnect the tractor and the implement.

Another important object of the instant invention is to provide a variable offset hitch structure for a semi-mounted rotary cutter secured to the three-point hitch of a tractor that permits lateral adjustment of the rotary cutter relative to the tractor for use in orchards having a variation in width of tree spacing.

The following U.S. Letters Patent comprise the most relevant prior art known to applicants:

| | | | |
|---|---|---|---|
| 1,859,001 | May | 17, 1932 | Meek |
| 2,658,770 | November | 10, 1953 | Koenig |
| 2,780,478 | February | 5, 1957 | Forsyth |
| 280/456 | March | 21, 1961 | Van Der Lely et al. |
| 280/456 | January | 2, 1962 | Van Der Lely et al. |
| 280/456 | September | 15, 1970 | Cowgill |

Figure 4:
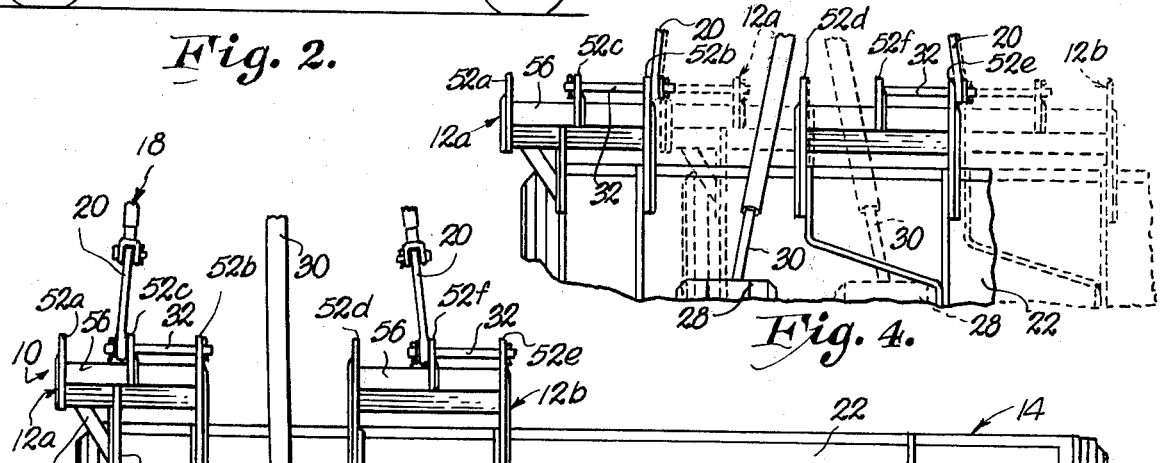
Figure 3:
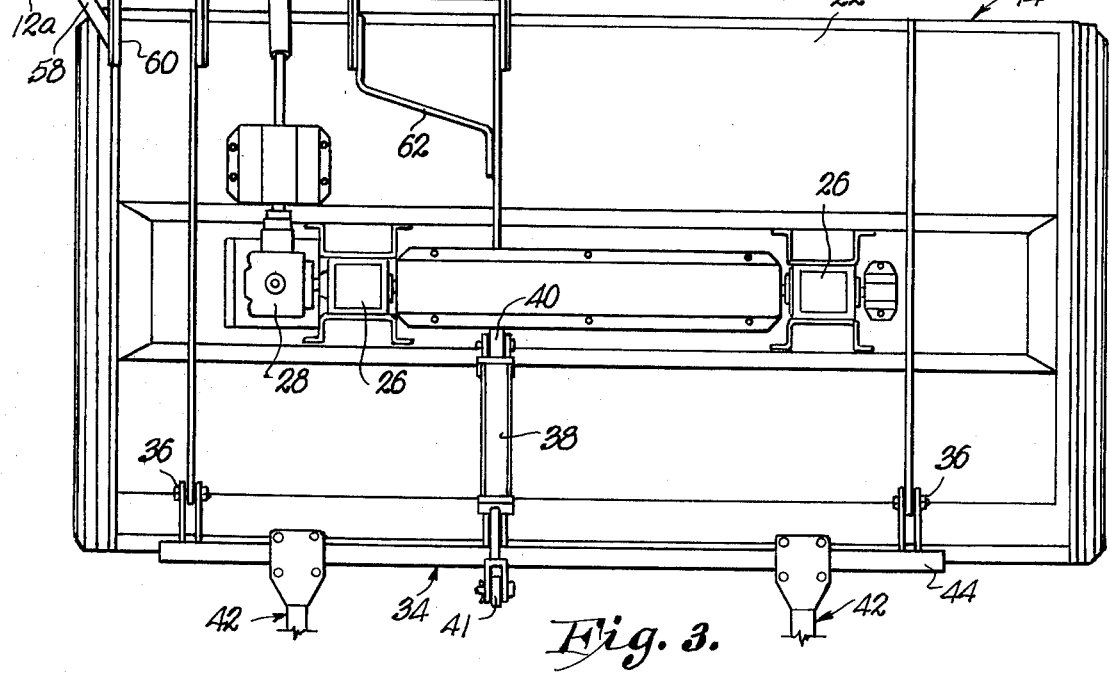

FIG. 3 is a fragmentary, top plan view of the rotary cutter illustrating the same as it would appear when attached to a towing tractor in its normally offset, trailing disposition; and FIG. 4 is a fragmentary, top plan view showing the variable offset hitch structure of the rotary cutter with solid lines illustrating the relationship of the tractor and cutter hitch components when the cutter is offset to the left of its normal trailing disposition relative to the tractor and the broken lines illustrating the relationship of the tractor and cutter hitch components when the cutter is offset to the right of its normal trailing disposition relative to the tractor.

A variable offset hitch structure, broadly identified by the numeral 10, has a pair of mounts 12 for securing an implement 14, such as a rotary cutter or the like, to a tractor 16 having a conventional three-point hitch assembly 18 in which a pair of laterally spaced, vertically swingable lift arms 20 project rearwardly from the tractor 16 for the purpose of receiving various implements that are to be towed by the tractor or, when used in its three-point hitch configuration, for carrying an implement.

As illustrated in the drawing, the implement 14 is in the nature of a rotary cutter having a mower housing 22 beneath which are disposed a pair of cutter assemblies 24 driven through respective, operably interconnected gearboxes 26. A drive box 28 supplies power to the gearboxes 26 and is coupled to the tractor 16 by a conventional telescoping drive shaft assembly 30 which receives its power from the tractor power takeoff (not shown).

The cutter 14 is secured to the tractor 16 in a semi-mounted relationship thereto with the forward end of the cutter 14 being carried by the hitch structure 10 which also includes a removable connecting pin 32 for each mount 12. Supporting the trailing or rearwardmost end of the cutter 14 is a caster wheel and frame assembly 34 secured to the mower housing 22 for selective vertical swinging movement relative thereto about a transverse, horizontal axis 36. Vertical disposition of the caster wheel and frame assembly 34 relative to the housing 22 is controlled by a fluid-actuated piston and cylinder assembly 38 that is operably coupled with the tractor 16 and extends between attaching brackets 40 and 41 located on the housing 22 and caster wheel and frame assembly 34 respectively. Furthermore, the caster wheel and frame assembly 34 is comprised of a pair of spaced, laterally adjustable caster wheel units 42 secured to a frame section 44. The units 42 each have a wheel assembly 46 swingable about a vertical axis 48 and each includes a spring-loaded, shock-absorbing mechanism 50 that permits its associated wheel assembly 46 to shift about a transverse, horizontal axis 51.

Figure 1:
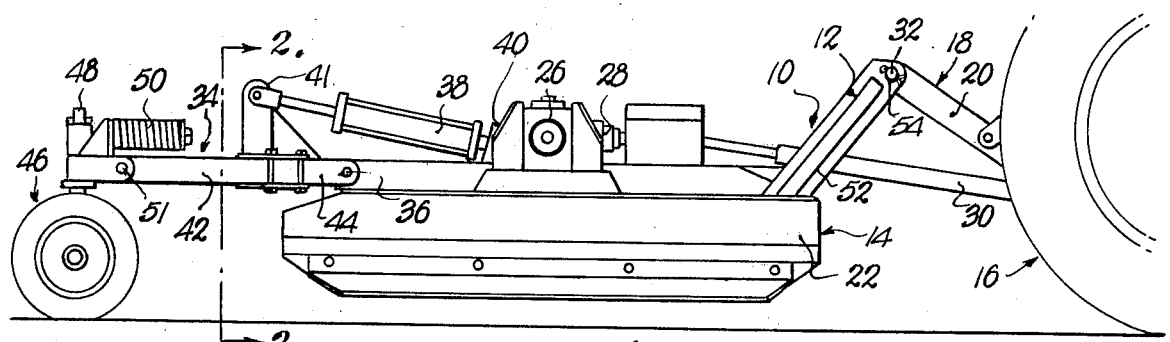
FIG. 1 is a fragmentary, side elevational view illustrating a semi-mounted rotary cutter secured to a towing tractor and having a variable offset hitch made pursuant to the present invention.

Turning now to the hitch structure 10, each mount 12 has a plurality of horizontally spaced lugs 52 that are each provided with an opening 54 for receiving one of the pins 32. The openings 54 are horizontally aligned transversely of the normal path of travel of the cutter 14 and are located at the uppermost and forwardmost end of the lugs 52 which extend upwardly from the cutter 14 and forwardly toward the tractor 16 as is most clearly shown in FIG. 1.

Figure 2:
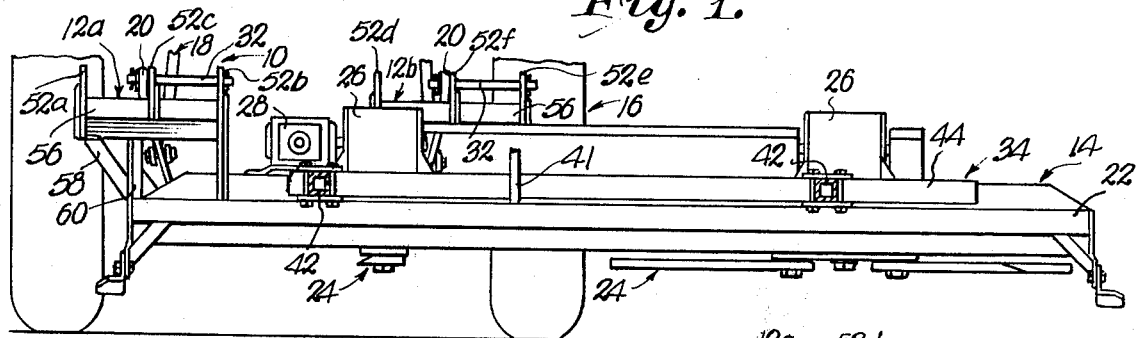
FIG. 2 is a fragmentary, rear elevational view taken along line 2—2 of FIG. 1.

The mounts 12 are horizontally spaced apart on the mower housing 22 proximal the forward edge thereof to present clearance for the driven shaft assembly 30 that extends between the tractor 16 and the drive box 28 with mount 12a being adjacent the left side of the cutter 14 (viewing FIGS. 2 and 3) while the other mount 12b is spaced inwardly from the opposite or right side of the cutter 14.

The lugs 52 of each mount 12a and 12b are equally spaced from one another with the lugs 52a and 52b of the mount 12a being interconnected by a cross member 56 to which the remaining or central lug 52c is joined, it being noted that the lug 52b is joined directly to the housing 22. Similarly, mount 12b has its lugs 52d and 52e joined directly to the housing 22 of the implement 14 and interconnected by a cross member 56 with the third lug 52f thereof being joined thereto. Suitable bracing, such as the brackets 58 and 60 for mount 12a and bracket 62 for mount 12b are provided for the purpose of providing structural reinforcement.

In use, when the cutter 14 is to be joined to the tractor 16 in its normally offset trailing disposition with the drive line 30 extending rearwardly from the tractor in a substantially parallel disposition relative to the longitudinal axis of the tractor and substantially parallel to the path of travel thereof, the lift arms 20 are located adjacent the central lugs 52c and 52f of the mounts 12a and 12b respectively, and are joined thereto through the use of corresponding pins 32 which extend from the lugs 52c and 52f to the corresponding adjacent lugs 52b and 52e. Thus, in viewing FIGS. 2 and 3, it will be seen that the cutter 14 is in a normal trailing disposition with the center line of the shaft 30 being in line with the drive box 28 and the right side of the cutter extending beyond the tractor. As explained above, this offset relationship between the cutter and the tractor is necessary to enable the operator to mow between the rows of orchard trees and beneath their overhanging branches with a minimum of interference therefrom.

The level of height adjustment of the front of the cutter 14 can be easily controlled by the tractor operator through manipulation of a selector valve (not shown) controlling the raising and lowering of the lift arms 20 with the mower 14 shifting about the horizontal, transverse axis defined by the pins 32. Further adjustment of the mower 14 with regard to the trailing edge thereof is controlled by the manipulation of the hydraulic piston and cylinder assembly 38 to adjust the caster wheel and frame assembly 34 about its horizontal, transverse pivot point 36. Therefore, and by way of illustration, if it is desired to place the mower 14 in a level disposition adjacent the ground, it is but a simple matter to manipulate the arms 20 to lower the mower 24 while at the same time manipulating the control for the piston and cylinder assembly 38 to swing the assembly 34 upwardly a corresponding distance and thereby level the mower. Conversely, if it is desired to raise the mower, opposite shifting of the lift arms 20 and the assembly 34 would accomplish such purpose.

Frequently, the occasion arises where it would be highly desirable to laterally adjust the offset relationship of the mower 14 relative to the tractor 16 to either decrease the lateral extension of the mower beyond the tractor to allow for narrower row spacing between orchard trees or the like, or to extend the reach of the mower beneath overhanging branches without affecting the capability to vertically adjust the mower. Such adjustment is easily and quickly accomplished by repositioning the arms 20 relative to their corresponding mounts 12. When the normal lateral offset is to be reduced, the lift arms 20 are easily relocated to the outside of their respective mounts 12 to the right thereof and placed adjacent respective lugs 52b and 52e with the corresponding pins 32 extending between their associated lugs 52b and 52c and 52e and 52f. In this configuration, the mower 14 has been shifted to the left relative to the tractor 16 with the drive line 30 also angling rearwardly to the left; such relative disposition being shown by the full lines in FIG. 4.

Additionally, in the event that a still further extension of the mower 14 to the right is required than that needed when the mower is in its normal offset disposition relative to the tractor, the lift arms 20 are merely repositioned such that they are outside of the mounts 12 to the left thereof as depicted by the broken lines in FIG. 4. In this configuration the lift arms 20 are adjacent their corresponding lugs 52a and 52d with the pins 32 extending between their corresponding lugs 52a and 52c and 52d and 52f.

The hitch structure herein disclosed provides great flexibility in selectively determining the extent to which the mower is laterally offset relative to the tractor. By merely removing two pins 32, relocating the lift arms 20 adjacent preselected pairs of lugs 52 and replacing the two pins, the readjustment is quickly accomplished with no need to alter the drive line connection between the tractor and mower. Furthermore, the capability of selectively adjusting the disposition of the mower blades 24 vertically relative to the ground through use of the lift arms of the tractor three-point hitch is in no way altered.

It is to be understood that while this variable offset hitch is presented in connection with an offset orchard rotary mower, that is equally adaptable for use with other semi-mounted implements carried by the lift arms of a three-point hitch.

Having thus described the invention, what is claimed as new and desired to be secured by Letters Patent is:

1. In combination with a tractor having a three-point hitch including a pair of powered, vertically swingable lift arms, an implement adapted to be towed by said tractor, and structure for coupling the implement with the tractor, said structure comprising:
   a pair of spaced mounts rigidly secured to the implement; and
   a removable connecting pin for each mount respectively adapted for pivotal attachment to corresponding arms,
   each mount having a plurality of horizontally spaced lugs,
   each lug being provided with a pin-receiving opening, the openings being horizontally aligned transversely of the normal path of travel of the implement and all of the lugs being so positioned that the distance between any lug of one mount and the corresponding lug of the other mount is the same as the spacing between the two arms,
   said identity in corresponding lug and arm spacing permitting attachment of the arms to their pins adjacent preselected corresponding lugs to dispose the implement in a normal trailing disposition behind the tractor, offset to the left of the normal trailing disposition relative to the path of travel of the tractor or offset to the right of the normal trailing disposition relative to the path of travel of the tractor.

2. The invention of claim 1, the pins each having a length for spanning the distance between preselected pairs of said lugs.

3. The invention of claim 2, the lugs extending upwardly from the implement and forwardly toward the tractor, the openings being at the uppermost and forwardmost ends of the lugs.

4. The invention of claim 3, certain of the lugs of each mount being joined directly to the implement and being provided with an interconnecting member, the remaining lugs of each mount being joined to the corresponding member.

5. The invention of claim 4, each mount having three equally spaced lugs.

6. The invention of claim 5, said mounts being horizontally spaced to present a clearance for a driven shaft between the tractor and the implement.

7. The invention of claim 6, one of said mounts being adjacent one side of the implement, the other of said mounts being spaced from the other side of the implement.

* * * * *